128,805

UNITED STATES PATENT OFFICE.

ELISHA S. MARTIN, OF RAHWAY, ASSIGNOR TO HIMSELF AND CHARLES WHITLOCK, OF NEW BRUNSWICK, NEW JERSEY.

IMPROVEMENT IN COMPOSITION PAVEMENTS.

Specification forming part of Letters Patent No. 128,805, dated July 9, 1872.

SPECIFICATION.

I, ELISHA S. MARTIN, of Rahway, in Union county, in the State of New Jersey, have invented a new and useful Composition Pavement, of which the following is a specification:

The object and purpose of this invention are to furnish a new and improved composition, whereof to make sidewalks and the like, which shall be free from bad odors from the first, not liable to injury from rains falling upon it soon after it is put down, and which has other incidental advantages. It is made principally of equal parts of coal-tar, pitch made from coal-tar, and asphalt, to which is added gum camphor, in the proportion of three pounds to each barrel of coal-tar. The coal-tar and pitch are melted together and the camphor added thereto. The asphalt is melted separately and then mixed with the other melted ingredients.

In laying down the pavement I first lay a substructure of about two inches of small cobble-stones, ranging in size from about the size of a goose's egg to the size of a robin's egg, which have been previously coated with coal-tar by pouring the tar over them and then raking them about. This I roll down first with a roller about twenty-two inches long, weighing about five hundred pounds, and afterward with a roller about twenty-four inches long, weighing about eight hundred pounds. I now mix screened sand with the melted tar, pitch, asphalt, and camphor, till the whole forms a stiff paste, which paste I put upon the substructure sufficiently to cover it when subsequently rolled, first with the light roll and then with the heavy one, to about an inch in depth. When well rolled I sprinkle the surface with water-lime to the depth of about one-sixteenth of an inch, and then roll the lime into the paste with the light roll.

I believe that the combination of the tar, pitch, and asphalt makes the most durable composition for this purpose yet known. The proportions given will best fulfill the conditions required; but they will approach this result in any combination. The camphor deprives the whole mass of bad odors from the first. The water-lime forms a thin scale over the walk impervious to water, and which will not wear away till the walk is sufficiently hardened to resist all action of the rain without this protection.

I claim as my invention—

1. The combination of tar, pitch, and asphalt (preferably in the proportions specified) as a composition for pavements and the like, when prepared and used substantially in the way and manner and for the purpose set forth.

2. Also, the use of camphor in composition of the general nature set forth to neutralize the bad odors thereof, substantially as described.

3. Also, the use of water-lime to form a final and temporary coating upon the surface of such compositions, substantially in the way and manner and for the purpose set forth.

ELISHA S. MARTIN.

Witnesses:
WM. W. HOWE,
W. B. MARTIN.